Patented Apr. 2, 1929.

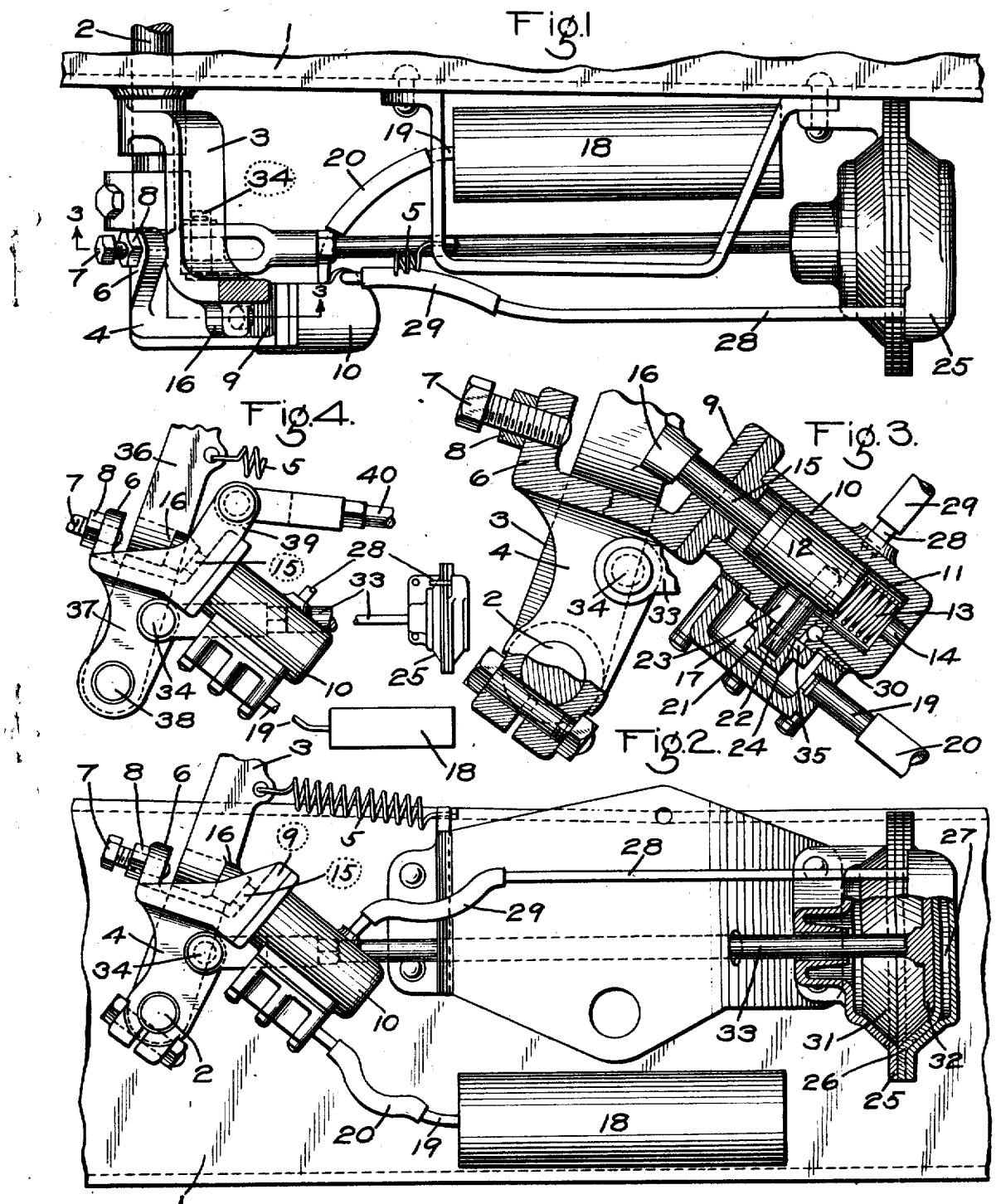

1,707,246

UNITED STATES PATENT OFFICE.

JOHN R. BARTHOLOMEW, OF MONTCLAIR, NEW JERSEY, ASSIGNOR TO THE WESTINGHOUSE AIR BRAKE COMPANY, OF WILMERDING, PENNSYLVANIA, A CORPORATION OF PENNSYLVANIA.

AUTOMOTIVE CLUTCH DEVICE.

Application filed June 4, 1927. Serial No. 196,445.

This invention relates to automotive vehicles and more particularly to a mechanism for such vehicles for controlling the operation of a clutch or a brake.

The principal object of the invention is to provide fluid pressure means applicable to an automotive vehicle clutch mechanism or to an automotive vehicle brake mechanism for controlling or for assisting in the control of the operation of one or the other of these mechanisms.

This and other objects and advantages will appear from the following detailed description.

Referring to the drawing, in which like reference characters refer to like parts; Fig. 1 is a plan view of the invention applied to an automotive vehicle clutch operating mechanism and mounted on a portion of the vehicle; Fig. 2 is a side elevational view of the same; and Fig. 3 is an enlarged sectional view of a portion of the mechanism, taken on the line 3—3 of Fig. 1. Fig. 4 is a view similar to Fig. 2 except that it illustrates how the invention may be applied to an automotive vehicle brake mechanism, the reservoir and flexible diaphragm chamber device being shown on a reduced scale.

Referring now in detail to the drawing, the reference character 1 indicates a portion of an automotive vehicle chassis which may be of any desired construction, and suitably journalled in this chassis, there is a shaft 2 adapted to be rotated to operate the usual clutch device (not shown), which forms a part of the usual drive mechanism.

The clutch operating shaft 2 is adapted to be operated through the medium of cooperating levers 3 and 4. The lever 3 is what is known as the clutch pedal and may be mounted on any suitable part of the vehicle, so that relative movement between the shaft and lever will be permitted. Interposed between, and connected with the lever 3 and a rigid part of the vehicle, there is a spring 5 which is adapted to return the lever from its clutch disengaged position to its clutch engaged position, as shown in the drawing, and tends to maintain the lever in this position. In the present embodiment of the invention the lower end portion of the lever is loosely mounted on the shaft 2.

The lever 4 is secured to the shaft 2 so that relative movement between this lever and shaft is not permitted, and is provided with an upwardly extending lug 6 through which an adjusting member 7 passes, the inner end of which is adapted to be engaged by the lever 3, as will hereinafter be more fully described. This member 7 has a screw-threaded connection with the lug 6, so that by rotating the member the space between the lever 3 and the member 7 may be varied. For the purpose of maintaining the preferred adjustment between the levers 3 and 4, the member 7 is provided with a check nut 8 which is adapted to cooperate with the lug 6 to prevent the accidental rotation of the member 7. The lever 4 is also provided with a pad or flange 9 which is spaced away from the lug 6 and has mounted thereon a valve device 10 which is movable with the lever.

The valve device 10 comprises a casing having a piston chamber 11 containing a piston 12 and a spring 13 adapted to act upon the piston 12, and this chamber is open to the atmosphere through a port 14. The piston 12 is provided with a stem 15, the outer end portion of which extends through one of the end portions of the casing and, in the present embodiment of the invention, also extends through an opening formed in the flange 9 and cooperates with a lug 16 on the lever 3. The casing of the valve device also has a slide valve chamber 17 which is connected with a fluid pressure reservoir 18 by a pipe 19 having a flexible portion 20. The chamber 17 contains a slide valve 21 which is connected with the piston 12 by a pin 22, which extends through a slotted aperture 23, leading from the face of the slide valve seat 24 to the piston chamber 11.

For the purpose of operating the lever 4, to release or assist in releasing the clutch device, a flexible diaphragm chamber device 25 is provided, comprising a casing in which a flexible diaphragm 26 is mounted, the chamber 27 at one side of the diaphragm being connected, by a pipe 28, having a flexible portion 29, with a passage 30 in the casing of the valve device leading to the slide valve seat 24. The chamber 31 at the other side of the diaphragm contains a follower 32 adapted to be operated by the diaphragm 26 and has attached thereto a push rod 33, the outer end of which is operatively connected with the lever 4 by a pin 34.

Assuming the clutch device of a vehicle to be engaged, the levers 3 and 4, and associated parts will be in the positions as shown in Figs. 1 to 3 inclusive. If it is desired to disengage the clutch device, the operator, by the use of his foot, moves the lever 3 forward, and as the lever is thus moved, the spring 13 of the valve device 10, which has been compressed, causes the piston 12, piston stem 15 and slide valve 21 to be moved forward until such time as the lever 3 engages the end of the adjusting member 7, at which time the slide valve 21 will have been shifted to such a position that it will uncover the passage 30 leading from the slide valve seat 24 and will permit fluid under pressure in the reservoir 18 and slide valve chamber 17 to flow through the passage 30 and pipe 28 to the chamber 27 of the diaphragm chamber device 25. Fluid under pressure in the chamber 27, acting upon the diaphragm 26, moves it, together with the push rod 33, outwardly, thus causing the lever 4 to be moved forward and the shaft 2 to be rotated in the clutch releasing direction. Should the operator continue to move the lever 3 forward the slide valve device and lever 3 will now remain in their same relative positions and fluid under pressure will continue to flow to the diaphragm chamber device 25 and the rod 33 and lever 4 will be moved forward a sufficient distance to further rotate the shaft and completely disengage the clutch device. To again operate the clutch device so that it will be in its engaged position, the operator removes pressure from the lever 3, permitting the spring 5 to move the lever 3 toward its clutch engaged position, causing the stem 15 and piston 12 to move inwardly a sufficient distance, that the slide valve 21 will be shifted to its release position, in which, a cavity 35 in the slide valve will connect the passage 30 and aperture 23, so that fluid under pressure in the chamber 27 of the diaphragm chamber device 25 will be vented to the atmosphere through the pipe 28, passage 30, slide valve cavity 35, aperture 23, piston chamber 11 and port 14. When the chamber 27 is thus vented, the spring 5, through the medium of the lever 3, together with the weight of the clutch device, will cause the lever 4 to be moved to shift the push rod 33 inwardly to its normal position, and will also cause the shaft to rotate to move the clutch device to its engaged position. If the operator desires a quick engagement of the clutch device, he removes all pressure from the lever 3, and if he desires a gradual engagement of the clutch device he gradually removes pressure from the lever 3.

Should the operator move the lever 3 until it engages the end of the adjusting device 7, the stem 15, piston 12 and slide valve 21 will be moved by the spring 13 to the positions in which the fluid under pressure from the chamber 17 and reservoir 18 will be supplied to the chamber 27 of the diaphragm chamber 25 and move the push rod outwardly, causing the lever 4 to be operated to rotate the shaft 5 in its clutch releasing direction, and should the operator now hold the lever 3 against further movement, the lever 4 and valve device 10 mounted thereon, will be moved forward and, as the stem 15 is in engagement with the lever 3, the casing of the valve device will be moved forward relative to the slide valve 21, piston 12 and stem 15 a sufficient distance that the slide valve will be in lap position, in which position, fluid under pressure is maintained in the chamber 27 of the diaphragm chamber device 25, at which time the automatic operations of the several parts of the invention cease and the clutch device is partially disengaged. Now, if the operator desires to further disengage the clutch device, he again applies pressure to the lever 3 until it again engages the adjusting member 7, when the operations, just described, will be repeated. By the release of pressure on the lever 3 at any time the clutch device will be moved to its engaged position, as hereinbefore described.

In Fig. 4 of the drawing, the invention has been shown applied to an automotive brake device. In this figure the cooperating levers 36 and 37 are both loosely mounted on a shaft 38 or any other suitable part of the vehicle. The lever 36 is what is known as the brake pedal and may be of substantially the same construction as the clutch pedal 3. The lever 37 differs from the lever 4, hereinbefore described, in that it is loosely mounted and is provided with a perforated lug 39 to which a brake rod 40 is operatively connected, such rod being connected to the usual brake apparatus (not shown). In this embodiment of the invention it will be understood that the clutch device cannot be operated through the medium of the levers 36 and 37. Except for the differences herein noted, the valve device 10, diaphragm chamber device 25, reservoir 18 and their connections are substantially the same as described in connection with the embodiment of the invention shown in Figs. 1 to 3 inclusive, and the operations of the several parts of the mechanism are substantially the same for controlling the brake as for controlling the operation of the clutch device.

From the foregoing description in connection with Figs. 1 to 3 inclusive of the drawing it will be seen that the operator has complete and positive control of the operation of the clutch device at all times and that the clutch device may be operated without any great effort on the part of the operator, and this is also the case in connection with the application of the device to the brake apparatus.

If for any reason the fluid pressure operating means should fail to function properly, the clutch or brake may be manually operated in the usual manner.

Having now described my invention, what I claim as new and desire to secure by Letters Patent, is:—

1. In an automotive vehicle, the combination with a pair of separately movable cooperating controlling levers, of fluid pressure operated means for operating one of said levers, and means cooperating with both of said levers for controlling the operation of said fluid pressure operated means.

2. In an automotive vehicle, the combination with a manually operable lever and a lever operable by fluid pressure means, of means carried by the last mentioned lever and operable by the first mentioned lever for controlling the operation of said fluid pressure means.

3. In an automotive vehicle, the combination with a pair of cooperating controlling levers, of a fluid pressure operated device for applying power to one of said levers, and a valve device carried by said lever and operable by the other of said levers for controlling the operation of said device.

4. In an automotive vehicle, the combination with a pair of separately movable cooperating controlling levers, of a diaphragm chamber device operatively connected with one of said levers, and means cooperating with both of said levers for controlling the operation of said device.

5. In an automotive vehicle, the combination with a pair of cooperating controlling levers being adapted to be moved a limited distance relative to each other, of means for operating one of said levers, and means carried by the other of said levers and operable upon the movement of one of said levers relative to the other for controlling the operation of the operating means.

6. In an automotive vehicle, the combination with a pair of cooperating controlling levers being adapted to be moved a limited distance relative to each other, of means for adjusting the degree of relative movement between said levers, power means for operating one of said levers, and means carried by the other of said levers and operable upon the movement of one of said levers relative to the other for controlling the operation of said power means.

7. In an automotive vehicle, the combination with a clutch operating member, of a pair of cooperating levers for operating said member, means operable by fluid under pressure for operating one of said levers, and a valve device carried by said lever for controlling the operation of said means, said valve being operable by the other of said levers.

8. In an automotive vehicle, the combination with a clutch operating member, of a lever for operating said member, means operable by fluid under pressure for operating said lever, a valve device carried by said lever for controlling the operation of said means, and a lever for operating said valve device.

9. In an automotive vehicle, the combination with a clutch operating shaft, of a pair of cooperating levers for operating said shaft, fluid pressure operated means for operating one of said levers, and means whereby the cooperation of both of said levers will control the operation of said fluid pressure operated means.

10. In an automotive vehicle, the combination with a rotatable shaft for operating a clutch device, a lever for operating said shaft, a valve device carried by said lever, means operable by fluid under pressure for operating said lever to disengage said clutch, and manually operable means for operating said valve device to control the operation of the fluid pressure operated means.

11. In an automotive vehicle, the combination with a member for operating a clutch device, of means operated by fluid under pressure for operating said member to disengage said clutch device, and manually operable means for controlling the admission of fluid under pressure to the first mentioned means.

12. In an automotive vehicle, the combination with a member for operating a clutch device, of a lever for operating said member to control the operation of said clutch device, a diaphragm chamber device including an operative connection to said lever adapted to be operated by fluid under pressure to disengage said clutch device, a valve device on said lever for controlling the supply of fluid under pressure to said diaphragm chamber device for disengaging said clutch device and to control the venting of the fluid under pressure from the diaphragm chamber device to permit the engagement of said clutch device, and a manually operable lever for controlling the operation of said valve device.

13. In an automotive vehicle, the combination with a member for operating a clutch device, a lever for operating said member, fluid pressure means for operating said lever, a valve device on said lever for controlling the supply of fluid under pressure to said fluid pressure means, a lever operable manually to permit said valve device, as it is operated, to supply fluid under pressure to said fluid pressure means, said valve device embodying means whereby a stoppage in the movement of the manually operable lever will cause the supply of fluid under pressure to said fluid pressure means to be shut off to render said fluid pressure means inoperative.

14. In an automotive vehicle, the combination with a member for operating a clutch device, of a lever for operating said member, means operable by fluid under pressure for operating said lever to disengage said clutch device, a valve device on said lever for controlling the operation of said means, a manually operable lever adapted to cooperate with said valve device to supply fluid under pressure to said means to disengage said clutch device; to vent the fluid under pressure in said means to permit the engagement of said clutch device, or to maintain pressure in said means upon the manually operable lever coming to a stop short of its normal clutch engaging position.

15. In an automotive vehicle, the combination with a member for operating a clutch device, of a lever for operating said member, a flexible diaphragm chamber device operable by fluid under pressure for operating said lever to disengage said clutch device, a valve device on said lever for controlling the operation of said flexible diaphragm chamber device, said valve device comprising a casing having a chamber connected with a fluid pressure supply reservoir and having a chamber connected with said flexible diaphragm chamber device and adapted to communicate with the first mentioned chamber, a valve in said casing adapted to be operated to open or close the communication between said chambers or to vent fluid under pressure from said flexible diaphragm chamber device, a piston for operating said valve, and manually operable means for controlling the operation of said piston.

16. In an automotive vehicle, the combination with a lever comprising a plurality of parts movable relative to each other for operating a clutch device or the like, of fluid pressure means for operating said device, and means operable manually through the medium of said lever for controlling the operation of said fluid pressure means.

17. In an automotive vehicle, the combination with a clutch operating member, of a lever comprising a plurality of parts movable relative to each other for operating said member, and fluid pressure means controlled by the manual operation of said lever for assisting in the operation of said member.

18. In an automotive vehicle, the combination with a lever for operating a clutch device or the like, of fluid pressure means for operating said lever, and means controlled through the manual operation of said lever for controlling the operation of said fluid pressure means.

In testimony whereof I have hereunto set my hand.

JOHN R. BARTHOLOMEW.

DISCLAIMER 1,707,246.—*John R. Bartholomew*, Montclair, N. J. AUTOMOTIVE CLUTCH DEVICE. Patent dated April 2, 1929. Disclaimer filed October 11, 1930, by the assignee, *The Westinghouse Air Brake Company*.

Hereby enters this disclaimer to claim 4 in said specification which is in the following words, to wit:

"In an automotive vehicle, the combination with a pair of separately movable cooperating controlling levers, of a diaphragm chamber device operatively connected with one of said levers, and means cooperating with both of said levers for controlling the operation of said device."

[*Official Gazette October 28, 1930.*]

the movement of the manually operable lever will cause the supply of fluid under pressure to said fluid pressure means to be shut off to render said fluid pressure means inoperative.

14. In an automotive vehicle, the combination with a member for operating a clutch device, of a lever for operating said member, means operable by fluid under pressure for operating said lever to disengage said clutch device, a valve device on said lever for controlling the operation of said means, a manually operable lever adapted to cooperate with said valve device to supply fluid under pressure to said means to disengage said clutch device; to vent the fluid under pressure in said means to permit the engagement of said clutch device, or to maintain pressure in said means upon the manually operable lever coming to a stop short of its normal clutch engaging position.

15. In an automotive vehicle, the combination with a member for operating a clutch device, of a lever for operating said member, a flexible diaphragm chamber device operable by fluid under pressure for operating said lever to disengage said clutch device, a valve device on said lever for controlling the operation of said flexible diaphragm chamber device, said valve device comprising a casing having a chamber connected with a fluid pressure supply reservoir and having a chamber connected with said flexible diaphragm chamber device and adapted to communicate with the first mentioned chamber, a valve in said casing adapted to be operated to open or close the communication between said chambers or to vent fluid under pressure from said flexible diaphragm chamber device, a piston for operating said valve, and manually operable means for controlling the operation of said piston.

16. In an automotive vehicle, the combination with a lever comprising a plurality of parts movable relative to each other for operating a clutch device or the like, of fluid pressure means for operating said device, and means operable manually through the medium of said lever for controlling the operation of said fluid pressure means.

17. In an automotive vehicle, the combination with a clutch operating member, of a lever comprising a plurality of parts movable relative to each other for operating said member, and fluid pressure means controlled by the manual operation of said lever for assisting in the operation of said member.

18. In an automotive vehicle, the combination with a lever for operating a clutch device or the like, of fluid pressure means for operating said lever, and means controlled through the manual operation of said lever for controlling the operation of said fluid pressure means.

In testimony whereof I have hereunto set my hand.

JOHN R. BARTHOLOMEW.

DISCLAIMER 1,707,246.—*John R. Bartholomew*, Montclair, N. J. AUTOMOTIVE CLUTCH DEVICE. Patent dated April 2, 1929. Disclaimer filed October 11, 1930, by the assignee, *The Westinghouse Air Brake Company*.

Hereby enters this disclaimer to claim 4 in said specification which is in the following words, to wit:

"In an automotive vehicle, the combination with a pair of separately movable cooperating controlling levers, of a diaphragm chamber device operatively connected with one of said levers, and means cooperating with both of said levers for controlling the operation of said device."

[*Official Gazette October 28, 1930.*]